US008365162B2

(12) United States Patent
Rauma

(10) Patent No.: US 8,365,162 B2
(45) Date of Patent: Jan. 29, 2013

(54) METHOD AND DEVICE ARRANGEMENT FOR MANAGING THE USE PROFILE OF A TERMINAL DEVICE

(75) Inventor: Tapio Rauma, Oulu (FI)

(73) Assignee: Capricode Oy, Oulu (FI)

( * ) Notice: Subject to any disclaimer, the term of this patent is extended or adjusted under 35 U.S.C. 154(b) by 1526 days.

(21) Appl. No.: 10/570,464

(22) PCT Filed: Sep. 27, 2005

(86) PCT No.: PCT/FI2005/050328
§ 371 (c)(1),
(2), (4) Date: Mar. 2, 2006

(87) PCT Pub. No.: WO2006/051159
PCT Pub. Date: May 18, 2006

(65) Prior Publication Data
US 2008/0222629 A1    Sep. 11, 2008

(30) Foreign Application Priority Data
Sep. 28, 2004   (FI) ..................................... 20041248

(51) Int. Cl.
*G06F 9/44* (2006.01)
*G06F 9/445* (2006.01)
*H04M 1/00* (2006.01)

(52) U.S. Cl. ........ 717/173; 717/168; 717/171; 717/174; 455/551

(58) Field of Classification Search .......................... None
See application file for complete search history.

(56) References Cited

U.S. PATENT DOCUMENTS

| 5,524,135 | A | * | 6/1996 | Mizikovsky et al. | ......... 455/419 |
| 5,689,825 | A | * | 11/1997 | Averbuch et al. | ............. 455/418 |
| 6,223,030 | B1 | * | 4/2001 | Van Den Heuvel et al. | .......................... 455/435.2 |
| 6,549,770 | B1 | * | 4/2003 | Marran | ......................... 455/419 |
| 6,781,972 | B1 | * | 8/2004 | Anderlind et al. | ............. 370/329 |
| 7,117,494 | B2 | * | 10/2006 | Rajaram | ....................... 717/174 |

(Continued)

FOREIGN PATENT DOCUMENTS

| EP | 1 401 224 A1 | 3/2004 |
| EP | 1 519 600 A2 | 3/2005 |

(Continued)

OTHER PUBLICATIONS

Stephen brown et al., "A New Model for Updting Software in Wireless Sensor Network" [ Online], IEEE-2006, pp. 42-47, [Retrived from Internet on Sep. 22, 2012], <http://citeseerx.ist.psu.edu/viewdoc/download?doi=10.1.1.158.8484&rep=rep1&type=pdf>.*

(Continued)

*Primary Examiner* — Thuy Dao
*Assistant Examiner* — Ziaul A Chowdhury
(74) *Attorney, Agent, or Firm* — Volpe and Koenig, P.C.

(57) ABSTRACT

A method, device arrangement, server, terminal device, and a computer program product for changing the use profile of a single terminal device of a cellular network are described. In the method, a server is connected to a telecommunications network, which sends to a single terminal device a program required by the change of its use profile as an over-the-air message, if the terminal device has found the program to be lacking from the terminal device when the new use profile is taken into use. Procedures according to the Device Management standard of Open Mobile Alliance are utilized in the messaging.

18 Claims, 2 Drawing Sheets

U.S. PATENT DOCUMENTS

| | | | |
|---|---|---|---|
| 7,516,451 B2 * | 4/2009 | Peng | 717/173 |
| 7,698,698 B2 * | 4/2010 | Skan | 717/168 |
| 7,810,088 B2 * | 10/2010 | Herle et al. | 717/173 |
| 7,814,478 B2 * | 10/2010 | Friedman | 717/173 |
| 7,881,745 B1 * | 2/2011 | Rao et al. | 455/551 |
| 8,171,468 B2 * | 5/2012 | Larsson et al. | 717/173 |
| 2002/0112047 A1 * | 8/2002 | Kushwaha et al. | 709/223 |
| 2003/0065738 A1 | 4/2003 | Yang et al. | |
| 2003/0110482 A1 * | 6/2003 | Ferguson et al. | 717/168 |
| 2003/0182414 A1 * | 9/2003 | O'Neill | 709/223 |
| 2004/0054569 A1 * | 3/2004 | Pombo et al. | 705/7 |
| 2004/0068721 A1 * | 4/2004 | O'Neill et al. | 717/168 |
| 2004/0083472 A1 * | 4/2004 | Rao et al. | 717/171 |
| 2004/0098715 A1 | 5/2004 | Aghera et al. | |
| 2004/0185883 A1 * | 9/2004 | Rukman | 455/466 |
| 2004/0253942 A1 * | 12/2004 | Mowry et al. | 455/410 |
| 2005/0153741 A1 * | 7/2005 | Chen et al. | 455/558 |
| 2006/0130053 A1 * | 6/2006 | Buljore et al. | 717/173 |
| 2007/0220494 A1 * | 9/2007 | Spooner | 717/130 |
| 2012/0117556 A1 * | 5/2012 | Hungerford et al. | 717/171 |

FOREIGN PATENT DOCUMENTS

| WO | WO 2004/051509 A1 | 6/2004 |
|---|---|---|
| WO | WO2006051159 A1 * | 5/2006 |

OTHER PUBLICATIONS

Tomasz Imielinski et al., "Mobile Wireless Computing Solutions and Chalange in Data Management" [Online], 1993, pp. 1-38, [Retrieved from Internet on Sep. 22, 2012], <http://citeseerx.ist.psu.edu/viewdoc/download?doi=10.1.1.55.3268&rep=rep1&type=pdf>.*

Shree Murthy et al., "An E_cient Routing Protocol for Wireless Networks" [Online], 1996, pp. 1-28, [Retrieved from Internet on Sep. 22, 2012], <http://www.dtic.mil/dtic/tr/fulltext/u2/a457192.pdf>.*

Amotz Bar-Noy et al. "Tracking mobile users in wireless communications networks" [Online], IEEE-1993, pp. 1-24, [Retrieved from Internet on Sep. 22, 2012], <http://citeseerx.ist.psu.edu/viewdoc/download?doi=10.1.1.57.2293&rep=rep1&type=pdf>.*

* cited by examiner

METHOD AND DEVICE ARRANGEMENT FOR MANAGING THE USE PROFILE OF A TERMINAL DEVICE

FIELD OF THE INVENTION

The invention relates to a method and device arrangement for implementing a change of the use profile of a terminal device. The invention also relates to a server used in the method and a terminal device of a cellular network utilizing the method. The invention also relates to a computer program product for implementing the method.

BACKGROUND

Various mobile, small data processing and communication devices are gaining popularity over devices installed as stationary. Examples of such devices are portable computers, mobile phones and PDAs (Personal Digital Assistant). The physical dimensions of mobile phones and PDAs are made as small as possible in order to make it easy to carry them along. However, the small size of the device limits the number of electronic components, such as memory components, that can be installed in a mobile phone, for example. And although the development of the manufacturing technique of memories has enabled manufacturing larger and larger memory units, the price of high-capacity memory components may become a factor that limits their use even in medium-priced devices designed for certain user groups.

The prevailing trend is that the small, mobile devices are also expected to cope with the same tasks as the alternative, stationary devices. In practice, this means loading large software entities into the device used. The number of programs loaded into the device is further increased by the fact that the user of the device may require the use of very different programs at different times. In this connection, we may speak of different use profiles. Examples of use profiles include the following alternatives describing the operation of the user of the device: work, leisure, home or travel.

In prior art mobile devices, it is possible for the user of the device to define use profiles at least partly on his own initiative. If different use profiles require different programs, it is then possible to end up in a situation in which the limited memory of the mobile device runs out, if an attempt is made to load the programs used by all use profiles of the user into it. The user must then make a decision on which programs can be kept continuously loaded in the device. It is also possible that the user must remove from and/or load programs into his device when he wants to change the use profile of his terminal device. From the user's point of view, a situation like this is inconvenient and not desired.

If the user does not want to carry out or is not capable of carrying out the measures described above, he must in one way or another limit his own use profiles to correspond to the memory capacity of his terminal device.

In principle, it would be possible to load the data, files or programs corresponding to the use profile of the terminal device from some external storage device every time the terminal device is switched on or when the use profile of the terminal device is wanted to be changed. However, this solution increases the need for data transfer so much that the limited data transfer capacity becomes a problem especially in wireless data transfer systems. Then the programs in the terminal device start slowly, because the transfer of programs into the terminal device takes place slowly through the limited data transfer channel. In addition, it may be unnecessary to load the programs, if the programs were already installed in the terminal device in connection with the previous use profile.

The operation described above is generally called Software Management. Software management has the following characteristics, for example: It enables one terminal device or server to remote control at least one other device. It also enables complementing a program or a part thereof in a terminal device by new information or parts of a program, which are located in another device. The validity of licenses, or rights of use, of the software is also managed by it.

The Open Mobile Alliance (OMA), which promotes the use of mobile communication devices, has published specifications, which deal with the updating and maintenance of software in mobile devices wirelessly using the OTA (Over-The-Air) technology; Generic Content Download Over The Air Specification, Version 1.0 20 Jun. 2002. The specifications OMA DM (Device Management) and OMA DS (Data Synchronization) describe some possible ways of implementing wireless maintenance of the files of mobile devices. These specifications describe the SynchML protocol (Synchronization Mark up Language) and how it is utilized in the synchronization of information contained by the hardware.

One possible factor, which starts the transferring or updating of the programs, can be a change taking place in the use profile of the device. However, the standards published by QMA do not define how the synchronization of data or updating could be started without separate measures of the user as a kind of automatic operation. So the user must himself start or manage the changes and updates of programs needed by the change of the use profile of his terminal device.

SUMMARY

It is an objective of the invention to provide a new method and device arrangement, by which it is possible to utilize the same use profiles in mobile terminal devices as in fixed terminal devices, even if the memory capacity of the mobile terminal device were too small for simultaneous saving of programs required by the use profiles of a device designed for fixed installation.

The objectives of the invention are achieved by a procedure and arrangement in which a background application according to the invention in a mobile terminal device monitors the changes of the use profile of the terminal device. When the background application detects a change in the use profile of the terminal device, the background application establishes a data transfer connection to a separate server, which, by using a wireless communications connection, OTA, starts, closes, updates, deletes or complements the programs needed by the changed use profile in the mobile terminal device.

The method according to the invention has the advantage that the mobile terminal device can virtually own more program applications than can be saved in its memory at a time.

The invention also has the advantage that the memory capacity of the terminal device can be sized as cost-efficient, even if there were a large number of use profiles, each with a different selection of programs to be utilized.

In addition, the invention has the advantage that the user of the terminal device need not worry about the actual changing of the programs, which takes place independently of the user by means of the wireless OTA technology, controlled by a separate server.

The method according to the invention for implementing the program updates required by a change of a use profile in a terminal device of a cellular network is characterized in that if, as a result of checking the availability of the programs, it is found that the terminal device does not correspond to the new use profile with regard to at least one program, the method comprises a step for transmitting a message concerning the lack of a program detected in the terminal device through a telecommunications network to a server managing the changes' of the use profile a step for transmitting at least one program according to the new use profile of the terminal device that was found to be lacking from the terminal device as an OTA message to the terminal device, and a step for installing the program received as an OTA message to the terminal device for making it possible to take its new use profile into use.

The device arrangement according to the invention for implementing the program updates required by a change of a use profile of a terminal device of a cellular network is characterized in that if the change of the use profile of a single terminal device results in a need to install a program belonging to the use profile in the terminal device, the terminal device is arranged to send a message indicating the need to install the program to a server in the device arrangement the server is, arranged to send the program as an OTA message to the terminal device, and the terminal device is arranged to install the program it has received for taking the changed use profile into use.

The server according to the invention, which manages the use profiles of terminal devices of a cellular network, is characterized in that the server comprises means for receiving from a terminal device a message with a request to install a program, caused by a change of a use profile of a single terminal device, and means for sending the program to the terminal device as an OTA message.

The terminal device of a cellular network according to the invention is characterized in that it comprises means for detecting a change that has taken place in a use profile of the terminal device means for communicating the change of the use profile to a server managing the changes of the use profile, if at least one program according to the use profile has not been installed in the terminal device means for receiving the uninstalled program as an OTA message from the server, and means for installing the program received as an OTA message in the terminal device.

The computer program product according to the invention, which is to be installed in a server managing the use profiles of terminal devices (11) of a cellular network, is characterized in that the computer program product comprises computer program means for receiving a message from a terminal device describing the lack of a program detected in the terminal device in connection with a change of a use profile, and computer program means for sending the program lacking from the terminal device and stored in the server as an OTA message to the terminal device for installing the program.

The computer program product according to the invention, which is to be installed in a terminal device of a cellular network for implementing the program updates required by a change of a use profile of the terminal device, is characterized in that the computer program product comprises computer program means for detecting a need to change a use profile in a terminal device computer program means for detecting the lack of a program required by the new use profile computer program means for sending a message describing the lacking program to a server managing the use profiles of terminal devices of a cellular network computer program means for receiving the lacking program as an OTA message from the server managing the use profiles, and computer program means for installing the program transmitted by the OTA message to the terminal device for taking the new use profile into use.

Some preferred embodiments of the invention are presented in the dependent claims.

The basic idea of the invention is the following: In the device arrangement according to the invention, all the programs used by the mobile terminal devices and the first program application according to the invention, which controls the loading of the programs, have been stored in the server according to the invention. In addition, information about all the terminal devices assigned to this server for management, fixed or mobile, and the use profiles utilized in each terminal device have been saved in this server. The size of the memory of a single mobile terminal device is possibly not sufficient for loading the programs required by all the use profiles into the mobile terminal device simultaneously. In the arrangement according to the invention, programs are loaded into the mobile terminal device according to the use profile that has been activated in the terminal device at the moment.

The second program application according to the invention, which is in the mobile terminal device, monitors the use profile of the terminal device. If the second program application according to the invention detects a change taking place in the use profile, it establishes a data transfer connection to the above mentioned server and notifies of a new use profile utilized in the terminal device. After this, the server managing the use profiles uses the OTA technology to change the programs of the mobile terminal device which notified of the change of the use profile such that they correspond to the new use profile. The server can, for example, close or start a program being already in the mobile terminal device, it can remove a program not belonging to the new use profile or install a new program which did not belong to the previous use profile. In addition, the server can complement a program which is already in the terminal device to meet the requirements of the new use profile either by adding components to it or by removing components from it.

BRIEF DESCRIPTION OF THE DRAWINGS

In the following, the invention will be described in detail. Reference will be made to the accompanying drawings, in which.

DETAILED DESCRIPTION OF THE PREFERRED EMBODIMENTS

Figure 1A:
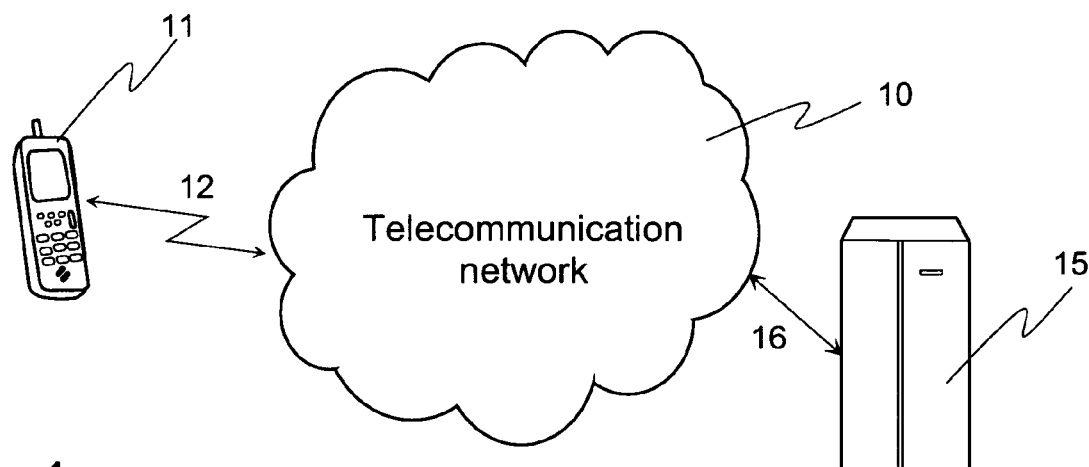
FIG. 1a presents, by way of example, a data transfer and device arrangement maintaining the use profiles according to the invention.

FIG. 1a shows devices and components of a telecommunications network participating in the use profile management procedure and the related data transfer procedure according to the invention by way of example. Reference number 11 denotes a mobile terminal device of a cellular network. The number of terminal devices 11 is not limited to one, as in FIG. 1a. Each mobile terminal device 11 can establish a wireless data transfer connection 12 to the telecommunications network 10. This telecommunications network 10 may comprise both wireless and wired network components. In the arrangement according to the invention, the wireless telecommunications network 10 comprises at least a prior art cellular network (not shown in FIG. 1a), to which the terminal devices 11 are connected. The cellular network may be a prior art network, such as a GSM, GPRS or UMTS cellular network.

A server 15 according to the invention has also been connected to the telecommunications network 10 shown by FIG. 1a either by a wired or wireless data transfer connection 16. In the method according to the invention, the server 15 can be either an independent server or it can be a functional part of a server already operating in the telecommunications network 10. A first program application according to the invention, which controls and implements the program changes required by the change of the use profiles in the terminal device 11, has been installed in the server 15. The updates and changes carried out in the terminal device 11 are advantageously performed wirelessly by the OTA technology, using procedures according to the OMA DM standard. In that case, for managing the updating of the programs required by the use profile it is only required that a data transfer connection 12 is established to the terminal device 11 to be updated through a cellular network, which is part of the telecommunications network 10. Therefore, the updating does not require taking the terminal device 11 to a place determined in advance for loading the programs required by the change of the use profile to the terminal device 11.

The server 15 serves a certain, predetermined group of terminal devices 11 in the manner described above. The memory capacity of the server 15 is manyfold compared to the memory capacity of a single terminal device 11. Therefore, at least the following information and programs can advantageously be stored in the server 15: the terminal devices served by the server, the use profiles of the terminal devices and all programs used in at least one terminal device 11 in at least one of its use profiles.

A second program application according to the invention, which monitors the use profile and its changes in a single terminal device 11, has been installed in each terminal device 11 of the cellular network. The use profile may change either as a result of an instruction given by the user of the terminal device 11, or it may also change on the basis of the time or the place of the terminal device, for example. However, the size of the memory of the terminal device 11 is limited, and therefore the programs required by all possible use profiles cannot be stored in it at the same time. The second program application according to the invention continuously monitors which use profile is activated in a single terminal device 11. If the second program application according to the invention detects a change in the use profile, it tests if all the programs of the new use profile have already been installed in the terminal device 11. If one or several programs are not installed, the second program application according to the invention sends a message describing the change of the use profile through the telecommunications network 10 to the server 15. The identification information of the terminal device 11, the current use profile, the new use profile and the programs saved in the terminal device 11 at the moment are advantageously described in the message. When the server 15 has received the information mentioned above, the first program application according to the invention in the server 15 starts, operating in accordance with the OMA DM standard and using OTA messages, the updating of the programs of the terminal device 11, from which it received the message concerning the change of the use profile. When the update or change of the programs has been carried out in the terminal device 11, the terminal device 11 can advantageously send an acknowledgement message to the server 15 of a successful change of the use profile.

Figure 1B:
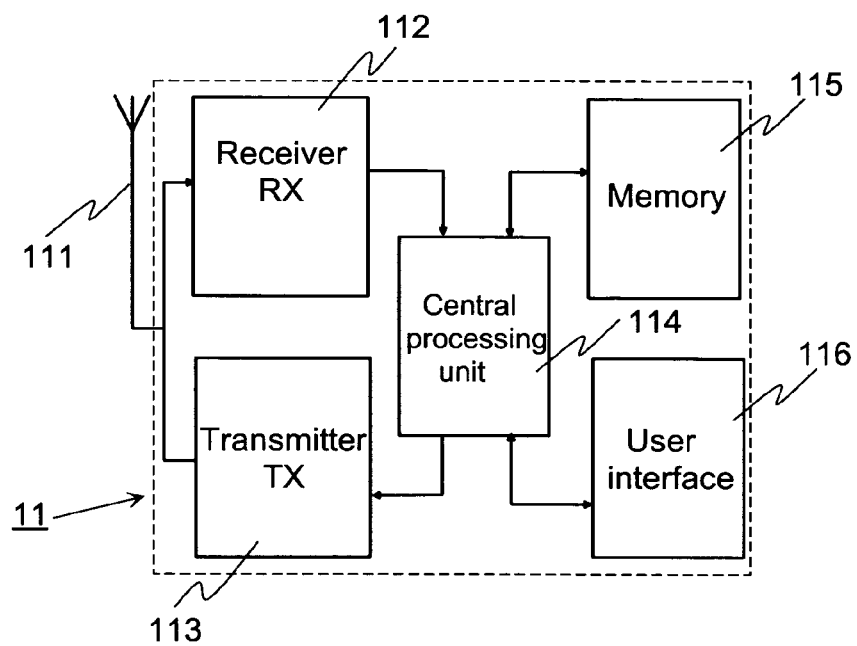
FIG. 1b shows, by way of example, a terminal device of a cellular network utilized in the data transfer and device arrangement according to the invention.

FIG. 1b shows, by way of example, the functional main parts of the terminal device 11 of a cellular network utilizing the method according to the invention. FIG. 1b shows only such main parts of the terminal device 11, which are needed in the procedure of monitoring and changing the use profile according to the invention.

The terminal device 11 uses the antenna 111 in the transmission and reception of signals in the communications network 10, which comprises at least a prior art cellular network. Reference number 112 denotes the receiver means RX of the terminal device. The receiver RX comprises prior art means for all messages or signals to be received from the cellular network. The receiver means RX 112 are also utilized in the reception of both the OMA messages, which comply with the DM standard, and the OTA messages.

Reference number 113 denotes the means which constitute the transmitter TX of the terminal device 11. The transmitter means 113 perform on the signal to be transmitted all the signal processing measures needed when working with the cellular network being used. The transmitter means TX, 113 are also used to transmit the messages concerning the use profile, which are needed in the procedure according to the invention, to the server 15.

In the terminal device 11, central parts with regard to the utilization of the invention are the central processing unit 114, which controls its operation, and the memory 115, in which the programs used by the terminal device 11 and the second program application needed in the monitoring and updating of the use profile according to the invention are advantageously stored. All the programs and instructions needed in the data transfer procedure according to the OMA DM standard can also be stored in the memory 115.

The terminal device 11 also includes a user interface 116. The user interface 116 advantageously comprises the display unit, keyboard, microphone and loudspeaker of the terminal device (not shown in FIG. 1b). The user of the terminal device 11 can give an instruction oh the change of the use profile by the user interface.

The central processing unit 114 controls all the functional parts of the terminal device 11. The second program application according to the invention, which monitors the change of the use profile, is executed in the central processing unit 114. When the program application detects a change of the use profile, the central processing unit 114 generates a message concerning the detected change, if at least one of the programs required by the new use profile has not been installed in the terminal device 11. The message is transferred by the transmitter means 113 first to the telecommunications network 10 and from it to the server 15.

The central processing unit 114 advantageously stores in the memory 115 the programs contained by the OTA transmission it has received as a reply to the change message it has sent. The OTA transmission may also contain various instructions concerning the programs already stored in the memory 115 or to be stored in it. Having received an instruction, the central processing unit 114 can, for example, remove a program not needed in the new use profile, close a program belonging to the previous use profile, start a program which was stopped earlier, or switch off the terminal device 11 when the change of the use profile has been performed.

Figure 2:
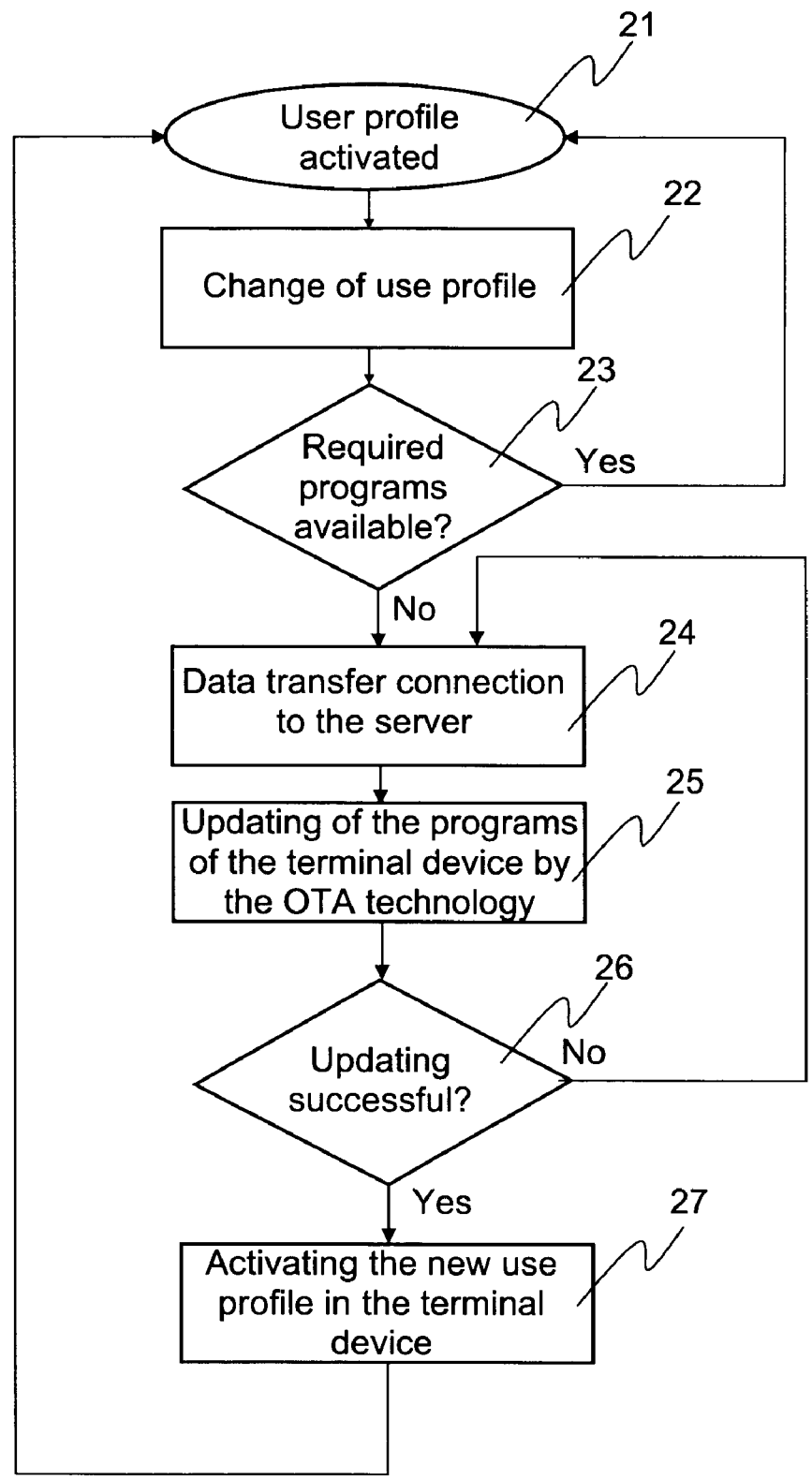
FIG. 2 presents, by way of example, the main steps of the method according to the invention as a flow chart.

FIG. 2 shows, by way of example, a flow chart of the main steps of the method according to the invention when the use profile is changed for another in the terminal device 11. In step 21 in the example of FIG. 2, the terminal device is in the operating state with the power switched on. One of the use profiles which are possible for the terminal device 11 is activated, in which case the programs required by this use profile are installed and in operation in the terminal device 11. The second program application according to the invention, installed in the terminal device 11, monitors the state of the use profile of the terminal device 11 all the time.

In step 22, the second program application according to the invention, installed in the terminal device 11, detects a change of the use profile. The change may be caused by an instruction given by the user of the terminal device 11 or some automatically generated need for a change. The automatic need for a change may be caused by the time or a change of the geographical location of the terminal device, for example.

In step 23, the program application according to the invention, which is in the terminal device 11, tests whether all the programs needed in the new use profile are installed and available in the terminal device 11. If the programs needed by the new use profile are available, the new use profile is activated, and the terminal device 11 returns to the operating state according to step 21. After this, the terminal device 11 functions with programs in accordance with the new use profile.

If it is found in step 23 that all the programs or changes required by the new use profile are not installed in the terminal device 11, in step 24 the second program application according to the invention, which is in the terminal device 11, first activates the establishment of a data transfer connection to the server 15 used for storing the use profiles. After this, some identification information on the terminal device 11 and information on the programs installed in the terminal device 11 and their state are transferred from the terminal device 11 to the server 15.

In step 25, the server 15 used for storing the use profiles sends all the programs needed by the new use profile, which are not yet installed, as OTA messages to the terminal device 11. The transfer, installation, removal and updating of the programs can advantageously be carried out by procedures according to the DM standard of OMA.

In step 26, the terminal device 11 tests whether the installation of the programs belonging to the change of the use profile succeeded or not. If the installation was not successful, the process returns to step 24. In this case, a message describing the failure of the installation is sent to the server 15, which controlled the installation, as a result of which the installation of the use profile can be tried again The server 15 has advantageously a counter, which counts the times of installation attempts and interrupts the installation attempts if the installation does not succeed with a certain number of attempts.

If it is found in step 26 that the installation of the programs required by the new use profile succeeded, the process moves to step 27, in which the programs according to the new use profile are taken into use. Taking into use may require switching the terminal device 11 off and on again, which can be carried out by instructions of the server 15. In an advantageous embodiment of the invention it is sufficient that the server 15 remote starts separately all the programs according to the new use profile while the terminal is in the operating state all the time.

When all the programs according to the new use profile have been installed in the terminal device 11 and they work, the terminal device 11 returns to a state according to step 21, in which programs according to the use profile which was last activated are utilized.

Some embodiments of the method for updating the change of the use profile and a device arrangement for utilizing the method according to the invention have been described above. The invention is not limited to the above described solutions only, but the inventive idea can be applied in many ways within the scope defined by the claims.

What is claimed is:

1. A method for implementing program updates required by a change of a use profile of a terminal device of a cellular network, the use profile including a list of programs required at a certain use situation of a user, the method comprising:

detecting in the terminal device, when the terminal device is in an operating state with power on, a need to change an activated use profile of the terminal device to another dissimilar use profile of the terminal device;

testing in the terminal device availability of the programs according to the another use profile and if finding that the terminal device does not comply with the another use profile with regard to at least one program;

transmitting a message concerning a lack of the program detected in the terminal device through a telecommunications network to a server managing the changes of the use profile of terminal devices;

transmitting at least one program according to the another use profile of said terminal device, found to be lacking in the terminal device, as an over-the-air (OTA) message to said terminal device; and installing the program received as an OTA message to a memory of the terminal device for making it possible to take the another use profile into use.

2. The method according to claim 1, wherein functional instructions are also transmitted to the terminal device as OTA messages for changing the use profile of the terminal device.

3. The method according to claim 2, wherein the functional instructions given to the terminal device comprise at least one of the following: install a program, remove a program, start a program, close a program or switch off the terminal device and switch it on after switching off.

4. The method according to claim 1, wherein procedures according to a Device Management standard of an Open Mobile Alliance are used in messaging between the terminal device and the server.

5. A system for implementing program updates required by a change of a use profile in a terminal device of a cellular network when the terminal device is in an operating state with power on, the use profile including a list of programs required at a certain use situation of a user of the terminal device, the system comprising:

a telecommunications network including at least one cellular network;

a server connected to said telecommunications network, in which programs needed by terminal devices of the cellular network in their use profiles are stored;

terminal devices of said cellular network, whereto various dissimilar use profiles are saved, and if a change of an activated use profile of a terminal device to another use profile results a need to install a program belonging to the another use profile of said terminal device, the terminal devices have been configured to:

detect when the terminal device is in an operating state with the power on, a need to change an activated use profile of the terminal device to another dissimilar use profile of the terminal device;

test in the terminal device availability of the programs according to the another use profile and if finding, that the terminal device does not comply with the another use profile with regard to at least one program;

transmit a message concerning the lack of the program detected in the terminal device through the telecommunications network to the serve managing the changes of the use profile of terminal devices:

the server has been configured to send said program as an over-the-air (OTA) message to said terminal device; and the terminal device has been configured to install the program it has received for taking the another use profile into use.

6. The system according to claim 5, wherein functional instructions have also been configured to be transmitted to the terminal device as OTA messages for changing the use profile of the terminal device.

7. The system according to claim 6, wherein the functional instructions given to the terminal device comprise at least one of the following: install a program, remove a program, start a program, close a program or switch off the terminal device and switch it on after switching off.

8. The system according to claim 5, wherein procedures according to a Device Management standard of an Open Mobile Alliance have also been configured to be used in messaging between the terminal device and the server.

9. The system according to claim 5, wherein the server includes:
a storage memory and processor;
programs utilized in said terminal devices;
means for receiving a message from a terminal device requesting an installation of a program to a memory of the terminal device, the installation being caused by a change of an activated use profile of a terminal device to another use profile of the terminal device when the terminal device is in an operating state with the power on, the activated use profile and the another use profile including dissimilar lists of programs required at certain use situations of a user; and
means for sending said program to said terminal device as an over-the-air (OTA) message.

10. The system according to claim 9, wherein the server has also been configured to send to the terminal device functional instructions for changing the use profile of the terminal device as OTA messages.

11. The system according to claim 10, wherein the functional instructions given by the server to the terminal device comprise at least one of the following: install a program, remove a program, start a program, close a program or switch off the terminal device and switch it on after switching off.

12. The server according to claim 9, wherein the server further comprises means for exchanging messages with the terminal device according to a Device Management standard of an Open Mobile Alliance.

13. The system according to claim 9, wherein the server further comprises a counter maintaining a number of installation attempts made in a single terminal device in connection with the use profile.

14. The system according to claim 5, wherein the terminal device comprises:
a receiver,
a transmitter,
a user interface,
a memory including computer program code, and
a central processing unit,
the memory and the computer program code configured to, with the central processing unit, cause the terminal device at least to perform:
a detection of a change of an activated use profile of a terminal device to another use profile when the terminal device is in an operating state with the power on, the activated use profile and the another use profile including dissimilar lists of programs required at certain use situations of a user;
a communication of the change of the use profile to the another use profile to the server managing the changes of the use profile, if at least one program according to said another use profile has not been installed in said terminal device;
a reception of said program as an over-the-air (OTA) message from said server, and
an installation of said program received as an OTA message to the memory of said terminal device.

15. The system according to claim 14, wherein the terminal device has also been configured to receive functional instructions from said server as OTA messages for changing the use profile of the terminal device.

16. The system according to claim 14, wherein procedures according to a Device Management standard of an Open Mobile Alliance have been configured to be used in messaging between the terminal device and the server.

17. A non-transitory data storage medium encoded with software readable by a data processing device for performing instructions for implementing program updates required by a change of a use profile of a terminal device of a cellular network, the use profile including a list of programs required at a certain use situation of a user of the terminal device, the software comprising:
computer program code for detecting in the terminal device, when the terminal device is in an operating state with power on, a need to change an activated use profile of the terminal device to another dissimilar use profile of the terminal device;
computer program code for testing in the terminal device availability of the programs according to the another use profile and if finding that the terminal device does not comply with the another use profile with regard to at least one program;
computer program code for transmitting a message concerning lack of the program detected in the terminal device through a telecommunications network to a server managing the changes of the use profile of terminal devices;
computer program code for receiving the program as an over-the-air (OTA) message from the server managing the use profiles; and
computer program code for installing the program received by the OTA message to a memory of the terminal device for making it possible to take the another use profile into use.

18. The non-transitory data storage medium according to claim 17, further comprising computer program code for receiving functional instructions from said server for changing the use profile of a terminal device.

* * * * *